United States Patent
Borthakur et al.

(10) Patent No.: US 10,944,771 B2
(45) Date of Patent: Mar. 9, 2021

(54) COMPUTING RESOURCE IDENTIFICATION

(71) Applicant: ServiceNow, Inc., Santa Clara, CA (US)

(72) Inventors: Apolak Borthakur, Palo Alto, CA (US); Manish Srivastava, Cary, NC (US); Yu Xia, Union City, CA (US)

(73) Assignee: SERVICENOW, INC., Santa Clara, CA (US)

( * ) Notice: Subject to any disclaimer, the term of this patent is extended or adjusted under 35 U.S.C. 154(b) by 423 days.

(21) Appl. No.: 15/586,017

(22) Filed: May 3, 2017

(65) Prior Publication Data
US 2018/0324198 A1 Nov. 8, 2018

(51) Int. Cl.
| H04L 9/00 | (2006.01) |
| H04L 29/06 | (2006.01) |
| G06F 8/61 | (2018.01) |
| G06F 16/9535 | (2019.01) |
| G06F 16/2457 | (2019.01) |
| G06F 9/50 | (2006.01) |

(52) U.S. Cl.
CPC ............ *H04L 63/1425* (2013.01); *G06F 8/61* (2013.01); *G06F 9/5061* (2013.01); *G06F 16/24578* (2019.01); *G06F 16/9535* (2019.01)

(58) Field of Classification Search
USPC .......................................................... 726/23
See application file for complete search history.

(56) References Cited

U.S. PATENT DOCUMENTS

| 5,978,594 | A | 11/1999 | Bonnell |
| 6,321,229 | B1 | 11/2001 | Goldman |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,359,951 | B2 * | 4/2008 | Goel ................. G06F 16/951 709/217 |
| 7,392,300 | B2 | 6/2008 | Anantharangachar |
| 7,617,073 | B2 | 11/2009 | Trinon |
| 7,685,167 | B2 | 3/2010 | Mueller |
| 7,716,353 | B2 | 5/2010 | Golovinsky |
| 7,769,718 | B2 | 8/2010 | Murley |

(Continued)

OTHER PUBLICATIONS

Extended European Search Report for European Application No. 18164711.6 dated Sep. 27, 2018; 10 pgs.

(Continued)

*Primary Examiner* — Christopher J Brown
(74) *Attorney, Agent, or Firm* — Fletcher Yoder, P.C.

(57) ABSTRACT

Systems and methods are disclosed for computing network operations. For example, methods may include identifying one or more partial matches between a value associated with a configuration item and a value associated with one or more computing resource types from a set of computing resource types; forming a search query based on the one or more partial matches; invoking a search of one or more information sources using the search query to obtain ranked search results; selecting one computing resource type from the set of computing resource types based on a ranking of the search results; and updating the configuration item to associate the configuration item with the selected computing resource type.

18 Claims, 9 Drawing Sheets

(56) References Cited

U.S. PATENT DOCUMENTS

| | | |
|---|---|---|
| 7,822,768 B2 | 10/2010 | Maymir-Ducharme et al. |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,151,261 B2 | 4/2012 | Sirota |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,202,050 B1 * | 12/2015 | Nachenberg ............ G06F 21/56 |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,833 B2 | 5/2017 | Mueller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,530,802 B2 * | 1/2020 | Thomas ................ G06F 3/0643 |
| 2010/0077401 A1 * | 3/2010 | Brant ....................... G06F 9/50 |
| | | 718/104 |
| 2010/0131322 A1 | 5/2010 | Koneti et al. |
| 2010/0161577 A1 | 6/2010 | Morozov |
| 2012/0198073 A1 | 8/2012 | Srikanth et al. |
| 2016/0063250 A1 * | 3/2016 | Spernow ............... G06F 21/552 |
| | | 726/23 |
| 2018/0124080 A1 * | 5/2018 | Christodorescu ... H04L 63/1425 |

OTHER PUBLICATIONS

Ayachitula, Naga et al. "IT service management automation—An automation centric approach leveraging configuration control, audit verification and process analytics." IBM Thomas J Watson Research Center, 4 pages.

Suzuki, Toshiyuki. "Systemwalker: Supporting Stable and Reliable IT Operation." Fujitsu Sci. Tech. J., 43, 3, p. 315-324 (Jul. 2007).

Wipfel, Robert et al. Novell. "USENIX HotCloud 10 IT Service Management for Federated Cloud Infrastructure as a Service."

Klosterboer, Larry, "Implementing ITIL Configuration Management." 252 pages. IBM Press (2008).

Moeller, Morten et al. Deployment Guide Series: IBM Tivoli Change and Configuration Management Database Configuration Discovery and Tracking v1.1. IBM SG24-7264-00. 548 pages (Jun. 2006).

DMTF "Configuration Management Database (CMDB) Federation Specification." Document No. DSP0252; Date: Jun. 22, 2009; Version: 1.0.0 (73 pages).

* cited by examiner

COMPUTING RESOURCE IDENTIFICATION

BACKGROUND

Computing networks can be large and complex, consisting of many thousands of hardware and software components. Maintaining and operating a large network can present many challenges. One challenge is keeping track of what computing resources are installed in the computing network. Discovery techniques may be employed to gather data about the computing resources installed or operating within a computing network. The data gathered about the computing resources in the network may be stored in a database with records associated with particular computing resources to model the current state or structure of the computing network.

SUMMARY

Disclosed herein are implementations of computing resource identification.

In an implementation, a system is provided for normalizing configuration items to facilitate network operations. The system may include a network interface, a memory, and a processor. The memory includes instructions executable by the processor to cause the system to access a configuration item associated with a computing resource; identify one or more partial matches between one or more values associated with the configuration item and one or more values associated with one or more computing resource types; form a string based on the one or more partial matches; receive data, via the network interface, from one or more information sources to obtain, based at least in part on the string, a list of results; rank results in the list of results based on occurrences of the one or more partial matches in the results; identify a candidate computing resource type based on at least a partial match between a record for the candidate computing resource type and a result from the ranked results; and update the configuration item to associate the configuration item with the candidate computing resource type.

In an implementation, a system is provided for normalizing configuration items to facilitate network operations. The system may include a memory and a processor. The memory may include instructions executable by the processor to cause the system to identify one or more partial matches between a value associated with a configuration item and a value associated with one or more computing resource types from a set of computing resource types; form a search query based on the one or more partial matches; invoke a search of one or more information sources using the search query to obtain ranked search results; select one computing resource type from the set of computing resource types based on a ranking of the search results; and update the configuration item to associate the configuration item with the selected computing resource type.

In an implementation, a method is provided for associating computing resource types with computing resources. The method may include forming a search query based at least in part on a configuration item; invoking a search of one or more information sources using the search query to obtain search results; identifying a candidate computing resource type based on at least a partial match between a record for the candidate computing resource type and a search result from the search results; updating the configuration item to associate the configuration item with the candidate computing resource type; and storing the updated configuration item.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
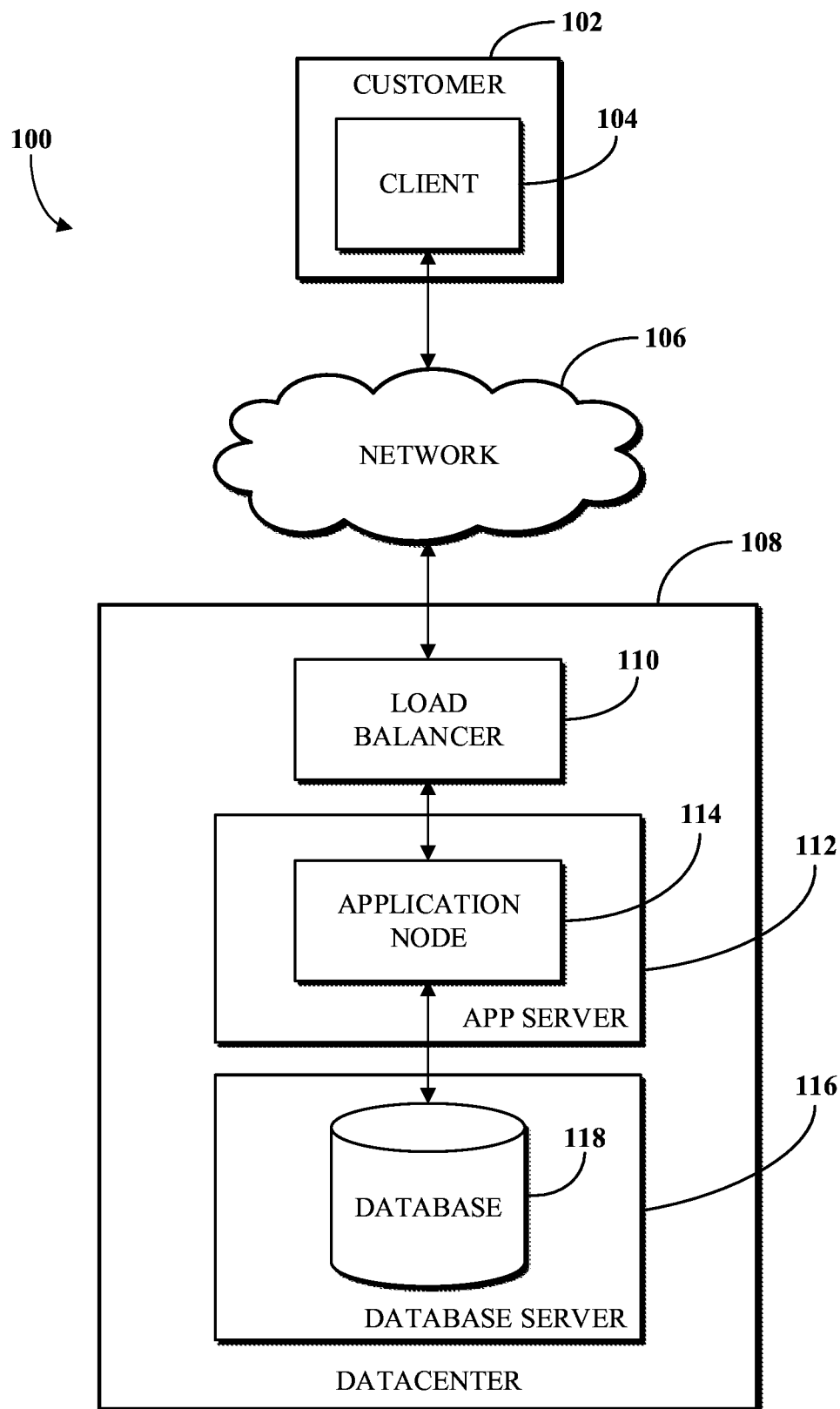
FIG. 1 is a diagram of an example of an electronic computing and communications system.

This document includes disclosure of systems, apparatus, and methods for identifying computing resources in a computing network to facilitate efficient operation of the computing network. For example, discovery techniques may be employed to find computing resources (e.g., hardware components or software components) that are installed or operating within a network, such as a large corporate or enterprise network. For example, the network can be probed to find hardware or software components, information about components can be received via user input, or combinations thereof. In practice, a corporate network may be probed to identify the laptops used by the corporation's employees, possibly to automate upgrades to the laptops. In another example, the corporate network may be probed to identify servers, routers, and/or other computers, among other hardware or software components, to deploy patches or updates to various such devices. The results of such discovery techniques may include strings of text or other data that describes a discovered computing resource.

Given that data about the computing resources may be discovered from a multitude of sources, certain descriptive information may have a number of variations which may limit the effective use of the data. For example, a name of a software application, a publisher of a software application, or a version of a software application may take various forms (e.g., a publisher could include a number of variations of "ServiceNow", such as servicenow, snow, now, NOW, Service-Now, service-now.com, and the like).

An approach to normalizing these descriptions is to match the discovered description with a database of known descriptions of recognized computing resources. For example, a database may associate the descriptions "servicenow", "now", and "snow" with "ServiceNow". However, the data describing a discovered computing resource may not exactly match any known descriptions of recognized computing resources. For example, there may be no defined association between "service-now.com" and "ServiceNow". This may be because, for example, the discovered computing resource may be encountered for the first time by a computing network operations system, or because the descriptive data found may include errors or variations due to manual entry.

In the absence of a match, a computing network operations system may not be configured to handle the discovered computing resource, causing inefficiencies in the operation of the network. In some computing networks, the number (e.g., tens of thousands) of these unrecognized computing resources can be a substantial portion (e.g., half or more) of the computing resources in the computing network, and this can significantly impact the usefulness of the data describing the computing resources. Identifying these unrecognized computing resources and normalizing their descriptive data to match the records of known computing resource types can facilitate handling of these computing resources and improve operations of a computing network.

In order to identify unrecognized computing resources, external information sources (e.g., Internet search providers, software vendor websites, hardware vendor websites, and/or network security databases) may be searched for additional information related to an unrecognized computing resource. The search may be conducted using a query that is based on the available (e.g., discovered) descriptive data for the unrecognized computing resource. For example, partial matches may be identified between descriptive data for an unrecognized computing resource and descriptive data for recognized computing resource types. These partial matches may be used to form one or more queries that may be used to search external information sources.

Information gathered from a search of one or more information sources may be ranked based on estimates of relevance. For example, search results may be ranked based on occurrences within a search result of partial matches between descriptive data for the unrecognized computing resource and descriptive data for recognized computing resource types.

A likely computing resource type may be identified for an unrecognized computing resource based on a partial match between a ranked search result and descriptive data for the likely computing resource type. Records for an unrecognized computing resource may then be associated with the likely computing resource type by updating descriptive portions of the records to match descriptive data for the likely computing resource type. In this manner, the records for unrecognized computing resources in a computing network may be normalized to facilitate efficient operations of the computing network.

In some implementations, security of a computing network may be improved by identifying potentially harmful computing resources (e.g., malware) within the computing network. For example, hardware metrics (e.g., processor usage, memory usage, or network bandwidth usage) within a computing network may be monitored to detect deviations from a normal range. When a deviation from a normal range is detected, discovery techniques may be employed to detect recently installed software components on effected hardware within the computing network. A network security database or website may be searched for information based on descriptive data about suspicious software components detected within the computing network. By matching the available data about a suspicious computing resource to known security threats (e.g., malware), the computing resource may be identified and appropriate network security threat mitigation measures may be employed.

Implementations of this disclosure provide technological improvements particular to computer networks, for example, those concerning the detection, identification, and management of computing resources in a computing network. Computer network-specific technological problems, such as an inability to efficiently maintain and operate a computing network including significant numbers of unrecognized computing resources, can be wholly or partially solved by implementations of this disclosure. For example, large numbers of unrecognized computing resources may be identified and descriptive data in records associated with those computing resources may be normalized. Implementations of this disclosure can thus introduce new and efficient improvements in the ways in which computing resources (e.g., hardware components or software components) are identified by searching outside information sources and evaluating partial matches with descriptive data for known computing resource types.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, an unrecognized computing resource of the customer 102 can be identified by a software module executed on the application node 114, which can include updating a configuration item stored in the database 118 to normalize a description of the computing resource. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
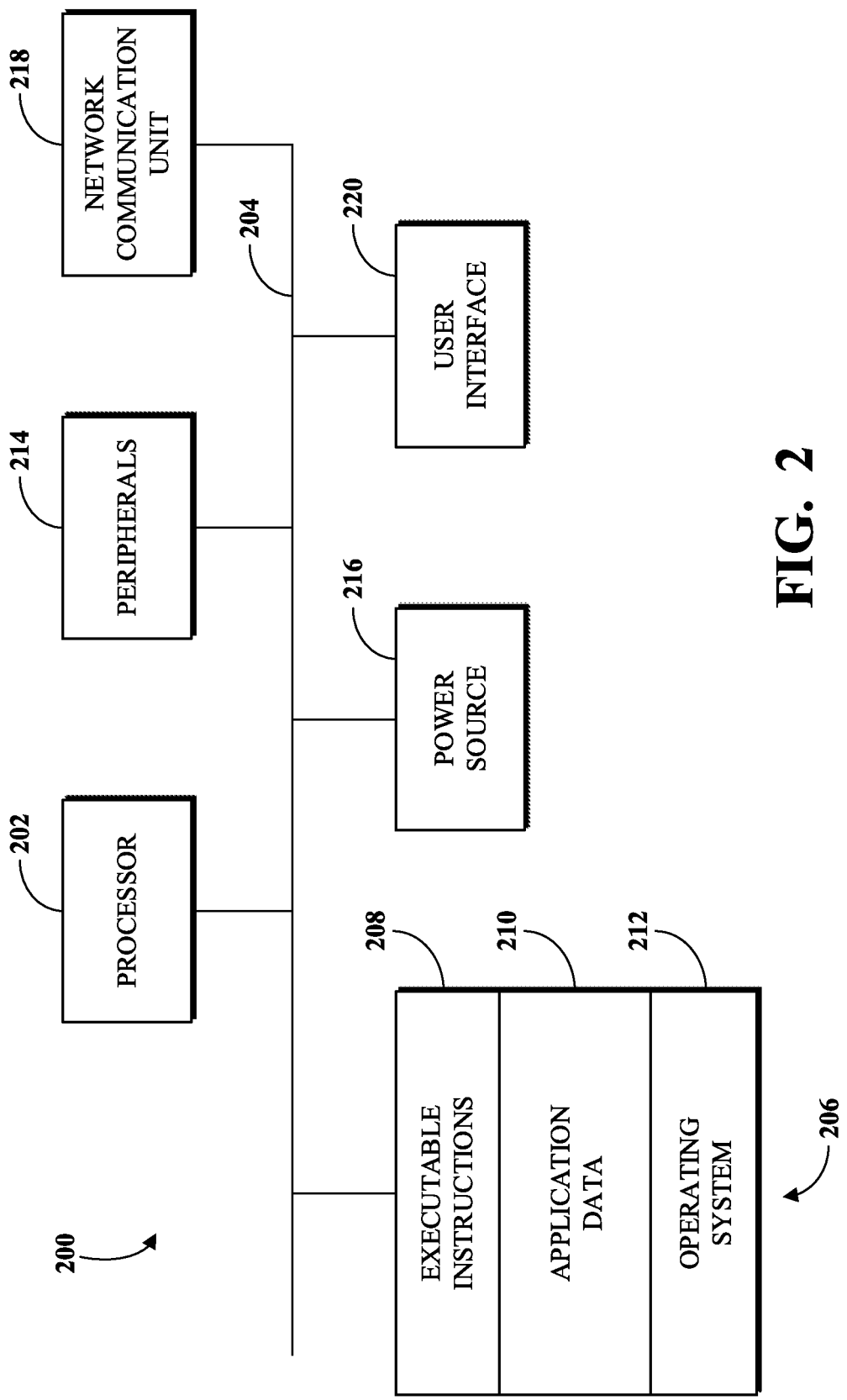
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to identify a computing resource of a computing network by searching outside information sources and identifying partial matches with descriptions of known computing resource types.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

In some implementations, a client and/or server can omit the peripherals 214. The operations of the processor 202 can be distributed across multiple machines, which can be coupled directly or across a local area or other type of network. The memory 206 can be distributed across multiple machines, such as network-based memory or memory in multiple machines performing the operations of clients and/or servers. Although depicted here as a single bus, the bus 204 can be composed of multiple buses, which can be connected to one another through various bridges, controllers, and/or adapters.

Figure 3:
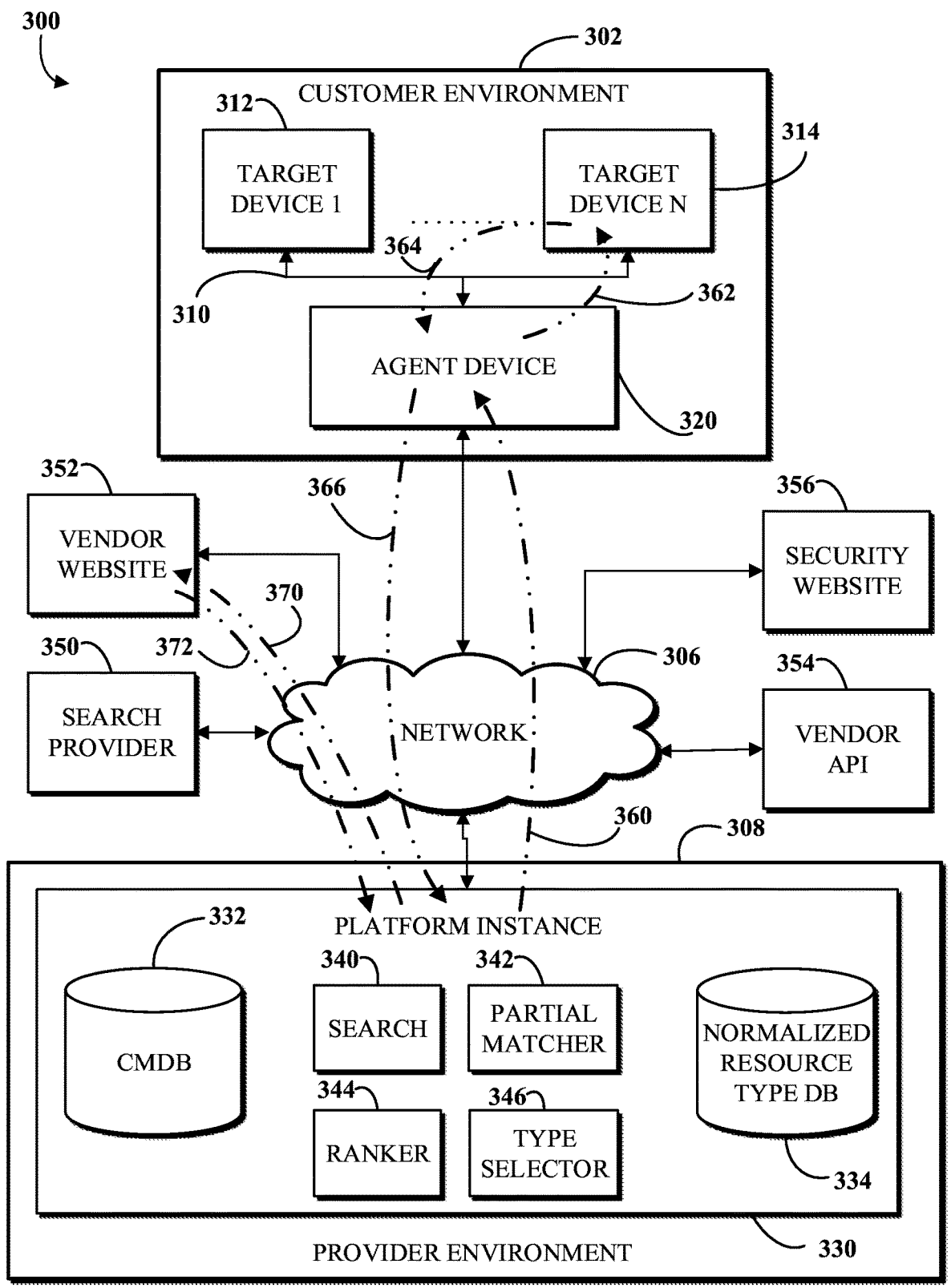
FIG. 3 is a block diagram of an implementation of a system usable for normalizing configuration items to facilitate network operations.

FIG. 3 is a block diagram of an implementation of a system 300 usable for normalizing configuration items to facilitate network operations. The system 300 can, for example, be implemented using some or all of electronic computing and communications system 100. For example, network 306 can be implemented using network 106, and platform instance 330 can be implemented using platform software executing on one or more application nodes 114 and data stored on one or more databases 118. For example, the platform software may be used to implement search module 340, partial matcher module 342, ranker module 344, and computing resource type selector module 346. For example, CMDB 332 and normalized resource type database 334 may be implemented by storing their associated data in databases 118.

The system 300 includes a customer environment 302 that may communicate, via a network 306 (e.g., the Internet or some other wide area network), with a provider environment 308. Devices and software in the provider environment 308 may be used to provide operational management functions for computing resources in the customer environment 302. For example, a provider environment may be bounded by one or more datacenters 108, as shown in FIG. 1. For example, a customer environment may be bounded by one or more firewalls that separate the customer environment from the network 306.

The customer environment 302 may include a number of devices connected by a customer network 310 (e.g., a firewalled local area network), including, for example, a target device 1 312 through a target device N 314 and an agent device 320. The provider environment 308 may include a platform instance 330 (e.g., running on a server device) and a CMDB 332 (e.g., running on a database server 116). The platform instance 330 may manage operations of the computing resources in the customer environment 302. The CMDB 332 may store models of the computing resources in the customer environment 302, including configuration items for target devices (e.g., the target device N 314) and for software components installed or running on the target devices in the customer environment 302.

The platform instance 330 is configured to recognize and manage computing resources of a set of known computing resource types. Information about known computing resource types may be stored in a normalized resource type database 334. A record for a known computing resource type in the normalized computing resource type database 334 may include identifying information (e.g., product name, version, manufacturer/publisher name, product description, edition, language, and/or operating system) for the computing resource type as well as information about additional properties (e.g., specifications, processor and memory requirements, dependencies, and/or license terms) of the computing resource type on which certain operational decisions for the customer environment 302 may depend. An example of a normalized computing resource type is Microsoft Office 365 Excel 2013 for Windows, which may be represented in the normalized computing resource type database 334 by a record including the fields: [publisher: "Microsoft", product: "Office 365 Excel", edition: "2013", version: "12.0.2.1.005", OS: "Windows", product description: "Microsoft Office 365 Excel 2013 for Windows (x86)—12.0.2.1.005"]. For example, the normalized computing resource type database 334 may be implemented as software running on one or more database servers, such as database server 116.

The platform instance 330 can initiate discovery of computing resources in the customer environment 302 by instructing the agent device 320, possibly referred to as a management instrumentation and discovery (MID) server or discovery server 320, to invoke discovery probes and return probe data to the platform instance 330. In some cases, discovered data for computing resources represented by configuration items in the CMDB 332 may not exactly match identifying information for the normalized computing resource types stored in the normalized computing resource type database 334. The platform instance 330 may include modules for identifying these unrecognized computing resources represented by these configuration items to enable proper configuration management of the computing resources. For example, the platform instance may implement technique 400 of FIG. 4 to identify an unrecognized computing resource represented by a configuration item. For example, the platform instance 330 may implement technique 600 of FIG. 6 to detect, identify, and mitigate network security threats (e.g., a network security threat posed by malware installed in the customer environment 302).

The platform instance 330 may include a search module 340 that is configured to search external information sources, such as search provider 350 (e.g., Google search or Bing search), a vendor website 352 (e.g., a Microsoft®, Oracle®, Intel®, or Advanced Micro Devices® website), a vendor API (Application Programming Interface) 354, and/or a network security website 356 (e.g., Symantec Internet Security Threat Report or government cyber threat information, such as at us-cert.gov), based on discovered data in a configuration item to gather information that may be relevant to the unrecognized computing resource. For example, the search module 340 may implement technique 520 of FIG. 5B.

Search results from the various information sources gathered by the search module 340 may be passed to a ranker module 344 to be ranked based on estimates of relevance. For example, the ranker module 344 may implement technique 550 of FIG. 5C.

The platform instance 330 also includes a computing resource type selector module 346 that is configured to select a known computing resource type from the normalized computing resource type database 334 based on the ranked search results from the ranker module 344. The computing resource type selector module 346 may call the partial matcher module 342 to determine the known computing resource type(s) with identifying data that best match a highly ranked search result. For example, the partial matcher module 342 may implement the technique 500 of FIG. 5A. For example, the computing resource type selector module 346 may select a computing resource type with identifying data in the normalized computing resource type database 334 that best matches the highest ranked search result. For example, the computing resource type selector module 346 may implement the technique 580 of FIG. 5D and assist a user to make the final selection of the proper computing resource type for the configuration item.

Once a known computing resource type has been selected by the computing resource type selector module 346, the initially unrecognized configuration item may be updated with identifying information that matches the selected computing resource type from the normalized computing resource type database 334. The updated configuration item may be stored in the CMDB 332. This updated configuration item may be easily mapped to the selected configuration item type associated data in the normalized computing resource type database 334 to enable efficient configuration management of the computing resource represented by the configuration item, and thus improve performance of a computer network of the customer environment 302. For example, computing resources of the customer environment 302 represented by configuration items may be accurately recognized despite varying descriptions associated with the configuration items, as described herein.

In an example scenario, the platform instance 330 sends a discovery command 360 to the agent device 320. In response, the agent device invokes a discovery probe 362 against target device N 314 within the customer environment 302 to obtain probe data 364 from the target device N 314. The agent device 320 then sends formatted probe data 366 to the platform instance 330. The platform instance 330 parses the probe data 366 to update the one or more configuration items in the CMDB 332; however, the probe data 366 for one of the configuration items does not exactly match identifying data for computing resources types in the normalized computing resource type database 334 (e.g., due to variations or differences between the discovered data and the identifying data), so the computing resource represented by the configuration item is initially unrecognized.

In the example scenario, the platform instance 330 identifies the computing resource represented by the configuration item based in part on a search of outside information sources. The configuration item associated with the unrecognized computing resource is accessed and the partial matcher module 342 identifies one or more partial matches between one or more values associated with the configuration item and one or more values associated with one or more computing resource types of the normalized computing resource type database 334. The search module 340 forms a string based on the one or more partial matches. This string may then be used by the search module 340 to search outside information sources, such as search provider 350, vendor website 352, vendor API 354, and/or network security website 356. For example, the search module 340 may scrape vendor website 352 by sending one or more requests 370 for data (e.g., an HTTP get request) to the vendor website 352, receiving website data 372 from the vendor website 352, and searching the website data for occurrences of the string or portions of the string. For example, discrete components (e.g., webpages or files) of the website data that include occurrences of the string or portions of the string may be output by the search module 340 as search results. In another example, the string may be submitted to the search provider 350 as a search query, and search results provided by the search provider 350 may be included in a list of search results output by the search module 340. In a similar manner, the search module 340 of the platform instance 330 may receive data, via a network interface, from one or more information sources to obtain, based at least in part on the string, a list of results.

In the example scenario, the search results are passed from the search module 340 to the ranker module 344, which ranks results in the list of results based on occurrences of the one or more partial matches in the results. For example, search provider rankings (e.g., determined using page rank algorithms) of search results may be leveraged when available. For example, search results from heterogeneous information sources may be ranked by comparing scores for those search results determined based on a count of occurrences of the one or more partial matches in a search result, the proximity of multiple partial match occurrences within a search result, the string length of a partial match occurrence in the search result, and/or weighting based on the position of an occurrence within a search result (e.g., weighting titles or other anchor text more heavily).

In the example scenario, the ranked search results are passed from the ranker module 344 to the computing resource type selector module 346, which identifies a candidate computing resource type based on at least a partial match between a record for the candidate computing resource type and a result from the ranked results. For example, the technique 500 of FIG. 5A may be employed to identify partial matches between text from a highly ranked search result and identifying data for computing resource types from the normalized computing resource type database 334. For example, a candidate computing resource type may be identified as the computing resource type with the best partial match(es) to a highly ranked search result.

In the example scenario, the configuration item is then updated to associate the configuration item with the candidate computing resource type. For example, one or more fields of the configuration item may be updated to match identifying data for the candidate computing resource type from the normalized computing resource type database 334. The updated configuration item is then stored in the CMDB 332.

The modules of system 300 may be implemented directly in hardware, firmware, software executed by hardware, circuitry, or a combination thereof. For example, modules may be implemented using a machine-readable program or other computer-executable instructions, such as instructions or programs described according to JavaScript, C, or other such instructions.

Alternative implementations of system 300 are possible. For example, aspects of system 300 may be implemented using additional, less, or differently configured modules, devices, or components than those shown. For example, system 300 may omit or not use some or all of vendor website 352, search provider 350, network security website 356, and/or vendor API 354. For example, the functionality described with respect to search module 340, partial matcher module 342, ranker module 344, and computing resource type selector module 346 may be implemented in a fewer or greater number of modules and may, for example, be implemented in a single software program. For example, CMDB 332 and normalized resource type database 334 may be implemented in different databases. For example, normalized resource type database 334 may instead be implemented by accessing an external data source, such as a software-as-a-service provider of normalized resource type information. For example, the aspects implemented within the provider environment 308 may instead be implemented as one or more application programs in an on-premises solution in the customer environment 302. For example, the agent device 320 may be omitted, and discovery may be carried out directly by one or more of the on-premises application programs.

Figure 4:
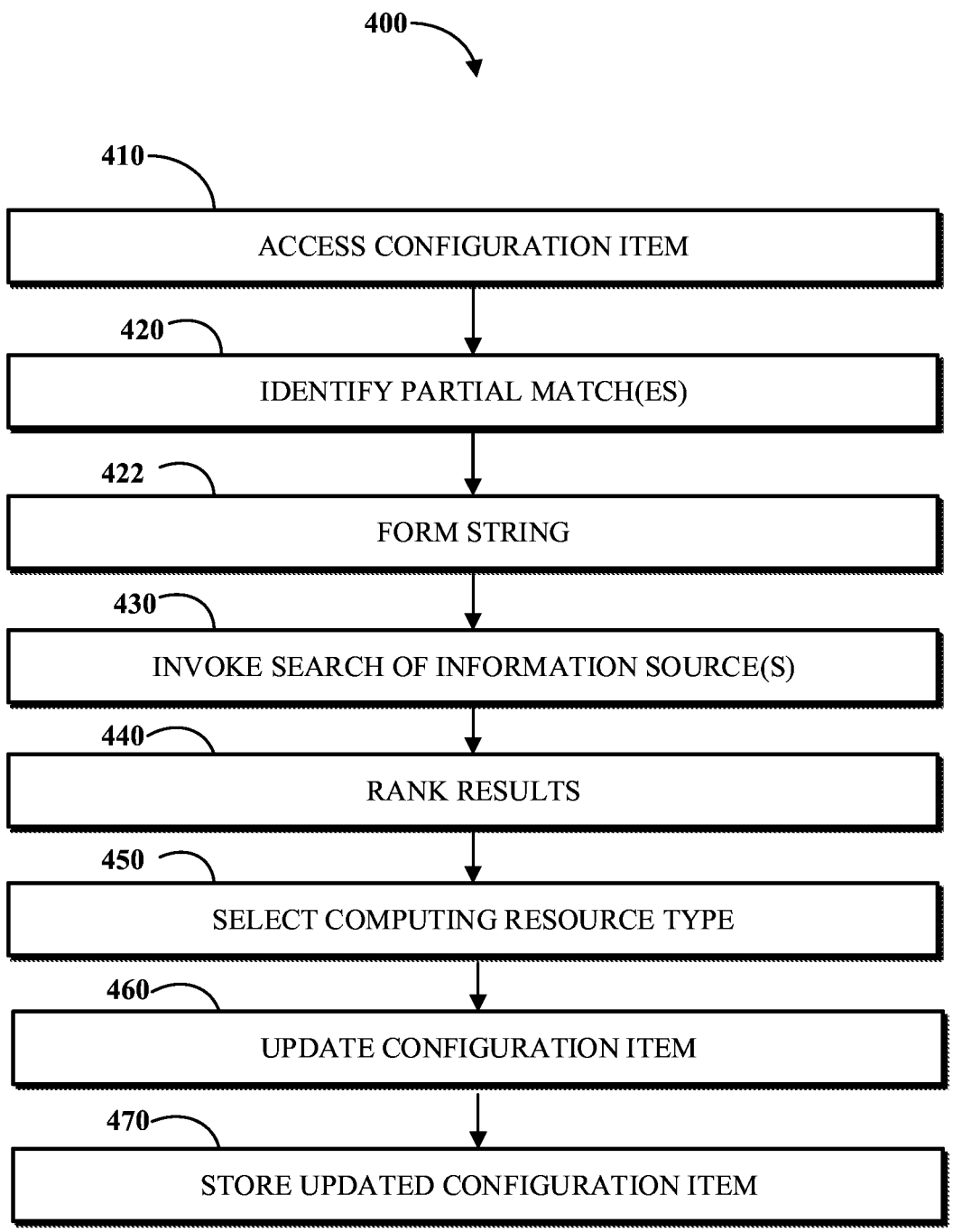
FIG. 4 is a logic flowchart illustrating an example of a technique for identifying a computing resource represented configuration item.

FIG. 4 is a flowchart illustrating an example of a technique 400 for identifying a computing resource represented configuration item in an electronic computing and communications system, such as the system 100 as generally illustrated in FIG. 1. In some implementations, the technique 400 can be executed using computing devices, such as the systems, modules, and devices described with respect to FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes accessing 410 a configuration item, identifying 420 partial matches with computing resource types, forming 422 a query, invoking 430 a search of external information sources using the query, ranking 440 the search results, selecting 450 a computing resource type based on the ranked search results, updating 460 the configuration item based on the selected computing resource type, and storing 470 the updated configuration item.

The configuration item may be accessed 410 by reading data of the configuration item from a database (e.g., the CMDB 332). In some implementations, the configuration item may be accessed 410 by receiving discovery probe data (e.g., probe data 366) concerning a computing resource represented by the configuration item and determining data of the configuration item based on the discovery probe data.

The technique 400 includes identifying 420 one or more partial matches between a value associated with the configuration item and a value associated with one or more computing resource types from a set of computing resource types (e.g., from the normalized computing resource type database 334). For example, the value associated with the configuration item may be an alpha-numeric string, and the value associated with one or more computing resource types may be an alpha-numeric string. For example, one or more strings (e.g., a discovered product description, a discovered file name, and/or a discovered publisher/manufacturer name) may be read from the configuration item, and the technique 500 of FIG. 5A may be implemented to identify 420 partial matches between the discovered data for the configuration item and identifying data for one or more computing resource types. In some implementations, the value associated with the configuration item may include foreign characters (e.g., Chinese characters or kanji) and identifying 420 one or more partial matches may include obtaining a machine translation of the value to a character set and/or language used to describe a set of computing resource types.

A string (e.g., a search query) is formed 422 based at least in part on the configuration item. For example, a string may be formed 422 based on unaltered discovered data, such as a product description string returned as discovery probe data (e.g., probe data 366). For example, a string may be formed by including a string from discovered data of the configuration item (e.g., a discovered file name) in a string comprising a question (e.g., "What software is file xyz.exe"). In some implementations, a string (e.g., a search query) is formed 422 based on the one or more partial matches. For example, a string may be formed 422 based on the one or more partial matches between fields of the configuration item and identifying data of computing resources type(s). In some implementations, multiple partial matches may be intelligently combined, concatenated, and/or revised to form 422 the string (e.g., a search query). In some implementations, logical operators (e.g., AND or OR) may be included when forming 422 a search query. For example, suppose a discovered product description value is "Accounting Microsoft Office Excel for Windows (x86)—12.0.2.1.005", and suppose the partial matches "Microsoft", "Office Excel", and "Windows" are identified between this configuration item and a computing resource type. A string (e.g., a search query) may be formed 422 as the unaltered "Accounting Microsoft Office 365 Excel 2013 for Windows (x86)—12.0.2.1.005". A string (e.g., a search query) may be formed 422 from one or more partial matches as "Office Excel", as "Office Excel Microsoft Windows", and/or as "'Office Excel' AND Microsoft AND Windows".

A search of one or more information sources is invoked 430 using a string (e.g., a search query) to obtain search results. For example, the technique 520 of FIG. 5B may be implemented to obtain search results. For example, a search may be invoked 430 by transmitting a search query to a cloud-based search provider (e.g., Google, Bing, or Yahoo search) and receiving search results in response to the search query. For example, a search may be invoked 430 by executing software to scrape one or more websites or other external information sources with requests (e.g., HTTP get requests) to access and search data found in those information sources for search results (e.g., webpages or files) that include occurrences of search terms or other portions of the string (e.g., a search query).

In some implementations, a search of one or more information sources is invoked 430 using a search query to obtain ranked search results, by submitting a search query to an external search provider and receiving search results that have been ranked by the external search provider. In some implementations, a search of one or more information sources is invoked 430 using a string (e.g., a search query) to obtain ranked search results, by scraping websites to find discrete components of data (e.g., webpages or files) with occurrences of one or more search terms from the string and then ranking these discrete components as search results (e.g., ranking based on the occurrences of the search terms from the string).

The search results are ranked 440 based on occurrences of search terms from the string (e.g., a search query). For example, search provider rankings (e.g., determined using page rank algorithms) of search results may be leveraged when available (e.g., the ranking provided by the search provider may be used as received). For example, search results from heterogeneous information sources may be ranked 440 by comparing scores for those search results determined based on a count of occurrences of the one or more search terms (of the string) in a search result, the proximity of multiple occurrences of search terms within a search result, the string length of an occurrence of a search term in the search result, and/or weighting based on the position of a search term occurrence within a search result (e.g., weighting titles or other anchor text more heavily). For example, the technique 550 of FIG. 5C may be implemented to rank the search results.

The technique 400 includes selecting 450 a computing resource type from a set of computing resource types (e.g., from the normalized computing resource type database 334) based on a ranking of the search results. For example, selecting 450 the computing resource type may include selecting one of the ranked search results (e.g., the highest ranked search result) based on the ranking of the search results, identifying a partial match between the selected one of the ranked search results and a value associated with the selected computing resource type, and selecting the one of the computing resource types based on the partial match between the selected one of the ranked search results and the value associated with the one of the computing resource types. For example, the technique 500 of FIG. 5A may be implemented to identify one or more partial matches between the selected search result and the selected computing resource type.

In some implementations, one or more candidate computing resource types are identified based on at least a partial match between a record for the candidate computing resource type (e.g., a record in the normalized computing resource type database 334) and a search result from the search results. For example, identifying a candidate computing resource type may include selecting one of the search results (e.g., one of the highest ranked) based on the ranking of the search results, and identifying (e.g., using the technique 500) a partial match between the selected one of the search results and a value associated with the candidate computing resource type. In some implementations, the technique 580 of FIG. 5D may be utilized to select 450 a computing resource type from a set of computing resource types (e.g., from the normalized computing resource type database 334) based on a ranking of the search results.

The technique 400 includes updating 460 the configuration item to associate the configuration item with the selected computing resource type. For example, fields of the configuration item may be updated to match corresponding identifying data for the selected computing resource type (e.g., corresponding fields in a record of the normalized computing resource type database 334). The updated configuration item may be stored 470 (e.g., stored in a database, such as the CMDB 332).

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, hardware metrics determined through network discovery operations may be utilized to trigger technique 400 targeting suspicious software components of a computing network in an attempt to detect, identify, and/or mitigate threats to network security (e.g., malware) that may be causing abnormal hardware metric values. Furthermore, one or more aspects of the systems and techniques described herein can be omitted. For example, operation 420 can be omitted and the search query may be formed 422 based on discovery data of the configuration item, without cross-referencing the normalized computer resource type data.

Figure 5A:
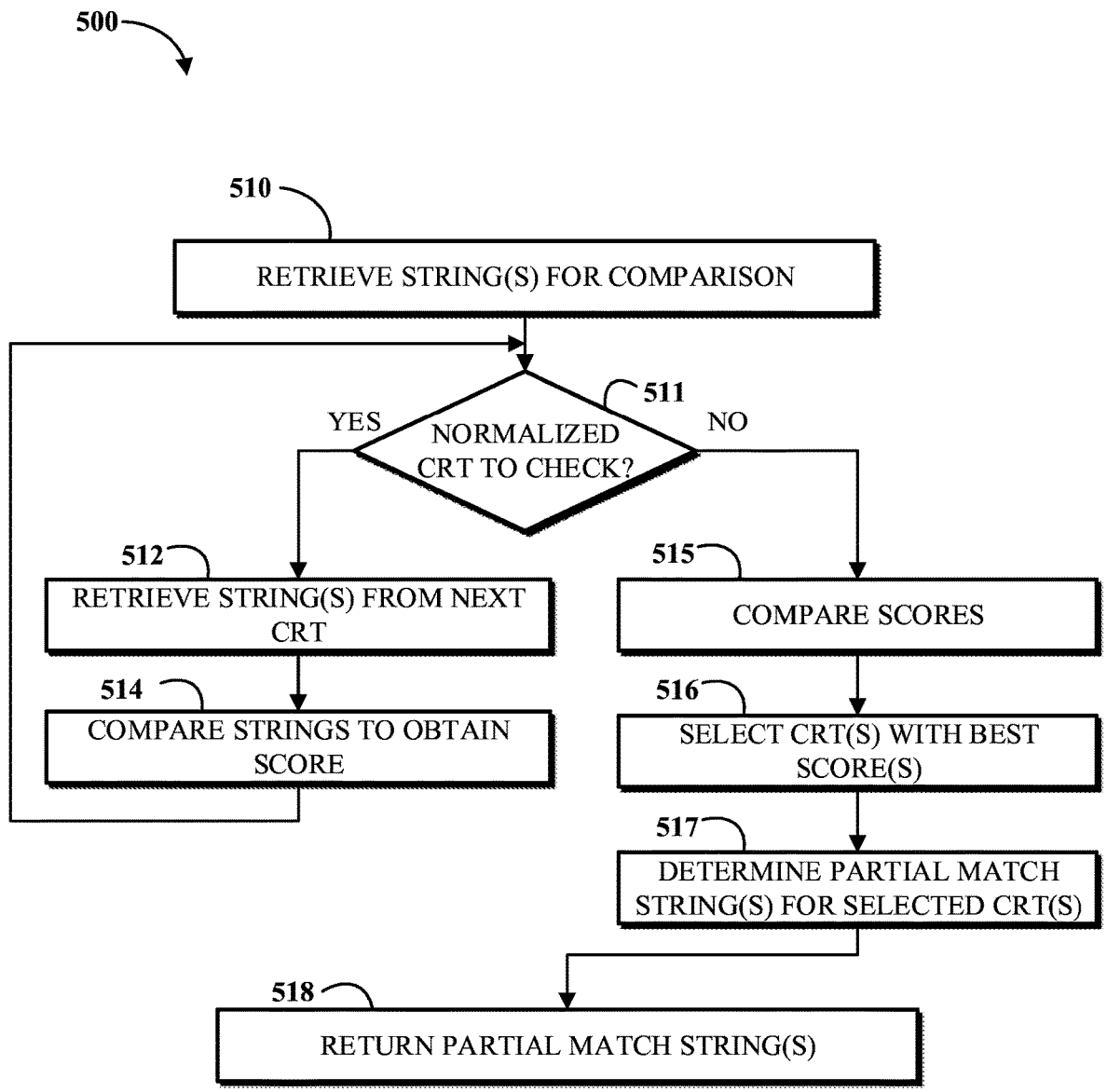
FIG. 5A is a logic flowchart illustrating an example of a technique for identifying one or more partial matches between strings of a configuration item or search result and strings describing computer resource types.

FIG. 5A is a flowchart illustrating an example of a technique 500 for identifying one or more partial matches between strings of a configuration item or search result and strings describing computer resource types in an electronic computing and communications system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The example technique 500 includes retrieving 510 one or more strings for comparison. For example, the strings may be alpha-numeric strings. For example, the strings may be one or more field values from a configuration item that is being compared to the computing resource types in a set of computing resource types (e.g., from the normalized computing resource type database 334). For example, the one or more strings may include a discovered product description, a discovered product manufacturer/publisher name, and/or a discovered version number. For example, the strings may be one or more strings from a search result (e.g., a search engine result entry, a webpage, or a file) that is being compared to the computing resource types in a set of computing resource types (e.g., from the normalized computing resource type database 334). For example, the one or more strings may include a title, a heading, a body, a footnote, software source code, and/or a script.

If (at operation 511) there are more computing resource types in the set that still need to be checked, then one or more strings for the next computing resource type are retrieved 512. For example, the one or more strings of the next computing resource type may include a product name, version, manufacturer/publisher name, product description, edition, language, and/or operating system. For example, the strings for the computing resource type may be alpha-numeric strings.

The one or more strings for the computing resource type are compared 514 to the one or more strings of the data object being partially matched (e.g., a configuration item or a search result) to obtain a partial match score. For example, partial matches may be found using linear programming techniques. For example, the partial match score for a computing resource type may be determined as a sum of the lengths (in characters) of the partial matches found among the one or more strings of the computing resource type and the one or more strings of the data object being compared (e.g., a configuration item or a search result). In some implementations, the partial match score for a computing resource type may be determined as a sum of Levenshtein distances between the one or more strings of the computing resource type and the one or more strings of the data object being compared (e.g., a configuration item or a search result). In some implementations, matches of a portion of a product name are ignored. For example, it may be desirable to ignore insignificant matches on common words like "for". In such an implementation, only matches of a complete product name to a portion of a string from the data object being compared will be considered for partial match scoring. In some implementations, publisher names occurring at the start of a product description string are detected and ignored by the partial match algorithm. In some implementations, where multiple product names appear in a discovered product description string, the leftmost (first) product name appearing in the string is considered and later product names are ignored. For example, where a string includes "Excel for Windows 7", "Excel" may be compared to the normalized strings and "Windows 7" may be ignored. In some implementations, substring matches with the maximum number of words are selected for scoring. In some implementations, matches of a version number to a subset of word are ignored. For example, if the product description includes the version number "12.0.2.1.001", a match with the generic version number "2.1" may be ignored, even though it matches a small portion of the longer version number. In some implementations, the set of computing resource types considered may be reduced by reclassifying certain instances of repeated updates (e.g., service pack hits) as child records from a parent record for this subset of the computing resource types.

If (at operation 511) there are no more computing resource types in the set of computing resource types to be considered, then partial match scores that have been obtained are compared 515. One or more computing resource types with the best (e.g., the highest or the lowest) partial match scores are selected 516. One or more partial matches (i.e., an intersection of a string for a selected computing resource type and a string for the data object being compared (e.g., a configuration item or a search result)) are determined 517. For example, the partial matches may be determined using linear programming techniques and/or rules to ignore certain types of intersections, as described in relation to operation 514. In some implementations, the partial matches have been determined at operation 514 and saved and are selected based on the selection at operation 516 of their associated computing resource type. The one or more determined partial matches for the one or more selected computing resource types may then be returned 518 (e.g., returned to the search module 340 that is forming a search query string or returned to the computing resource type selector module 346 that is selecting a computing resource type based on ranked search results).

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Figure 5B:
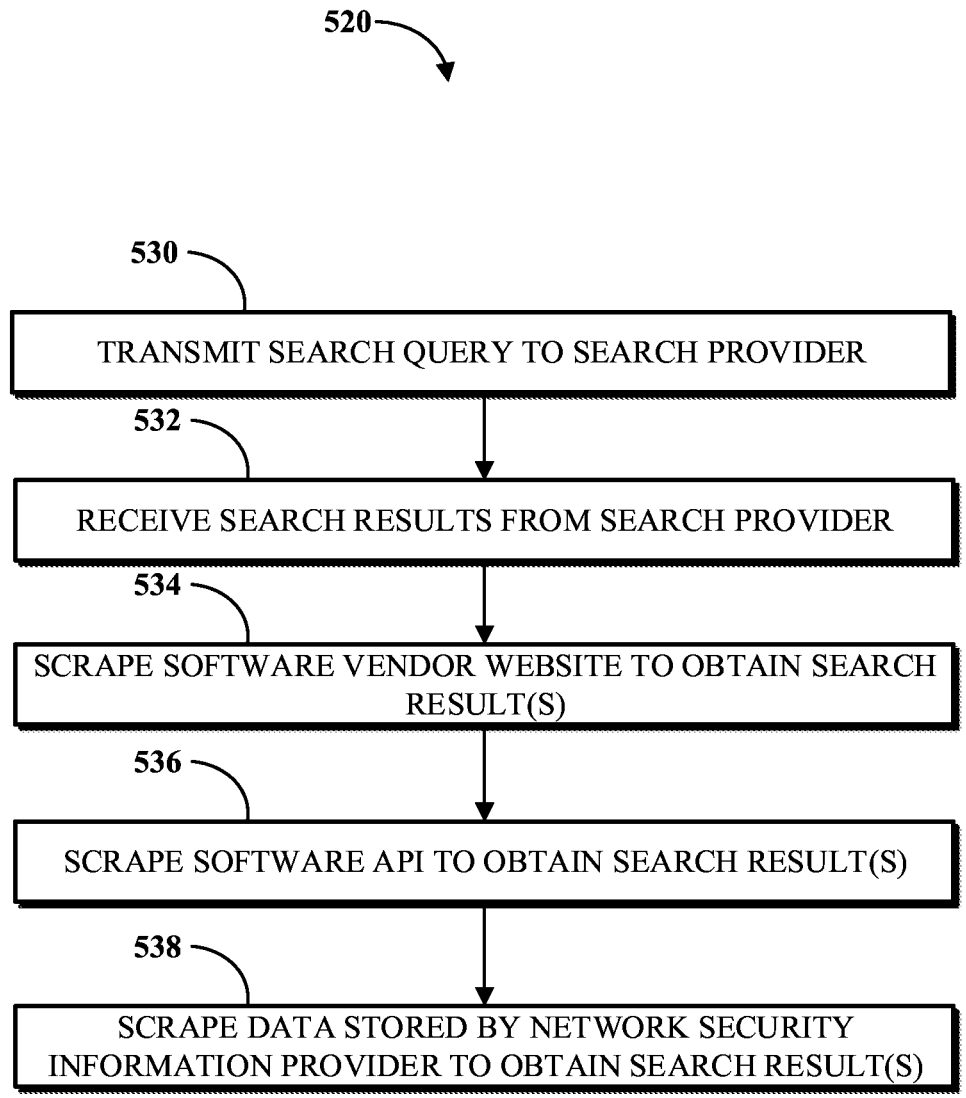
FIG. 5B is a logic flowchart illustrating an example of a technique for searching information sources for information that may be related to an unrecognized computing resource.

FIG. 5B is a flowchart illustrating an example of a technique 520 for searching information sources for information that may be related to an unrecognized computing resource in an electronic computing and communications system, such as the system 100 as generally illustrated in FIG. 1. In some implementations, the technique 520 can be executed using computing devices, such as the systems, modules, and devices described with respect to FIGS. 1, 2, and 3. In some implementations, the technique 520 can be performed, for example, by executing a machine-readable program or other computer-executable instructions, such as instructions or programs described according to JavaScript, C, or other such instructions. The steps, or operations, of the technique 520 or any other technique, method, process, or algorithm described in connection with the implementations disclosed herein can be implemented directly in hardware, firmware, software executed by hardware, circuitry, or a combination thereof.

The example technique 520 includes transmitting 530 a search query to a search provider. A search query is a string that includes one or more search terms (e.g., words or phrases) that may be used to search for related text in various forms of documents or other stored data. In some implementations, a search query may include special characters or words (e.g., "&", "AND", "||", "OR") that serve as logical operators to instruct a search engine or algorithm and specify how search terms within a query should be related to each other and/or search results. For example, the search query may be a string transmitted 530 to a cloud-based search provider (e.g., a search engine such as Google, Yahoo, or Bing) as part of a search request. For example, the search query may be submitted using an application programming interface (API) of a search engine. In some implementations, the search query may be submitted to a customized search engine (e.g., Google Custom Search). For example, the search query may be transmitted via a network interface (e.g., the network communication unit 218).

In response to receiving the search query, the search provider may conduct a search of a collection of data (e.g., part of the Internet) and generate a set of search results that it determines to be related to the search query. The search provider may rank (e.g., using the page rank algorithm) the set of search results that it generates. Some or all of the set of search results generated by the search provider may be received 532 by the device (e.g., the application server 112) that transmitted 530 the search query. In some implementations, a highest ranked subset of the generated search results is received 532. For example, the search results may be received 532 in the form of a search page with multiple entries that are the highest ranked search results. The results page may be parsed to extract the search results to be considered. For example, the search results may be received via a network interface (e.g., the network communication unit 218).

A software vendor website is scraped 534 to obtain search results (e.g., webpages or files) related to the search query (e.g., search results that include occurrences of one or more search terms from the search query). For example, the website may be scraped 534 by transmitting (e.g., via the network communication unit 218) one or more HTTP get requests to the website server. In response to the get request(s), data may be received and searched for occurrences of one or more search terms from the search query. In some implementations, a search term of the search query may be a partial match identified between an unrecognized configuration item and a normalized computing resource type. For example, hundreds (e.g., 200) websites of the most prominent vendors of computing resources may be scraped 534.

A software API is scraped 536 to obtain search results related to the search query (e.g., search results that include occurrences of one or more search terms from the search query). Some software vendors provide APIs (application programming interfaces) that list available software and details such as product name and version. These may be rich sources of relevant data when they are available. For example, a software API may be published on a website or through a publicly accessible database or file transfer protocol server.

Data stored by the network security information provider is scraped 538 to obtain search results (e.g., network security threat records or files) associated with malware that are related to the search query (e.g., search results that include occurrences of one or more search terms from the search query). For example, the stored data may be scraped 538 by transmitting (e.g., via the network communication unit 218) one or more HTTP get requests to a website server or one or more database queries to a database server. In response to the request(s), data may be received and searched for occurrences of one or more search terms from the search query. In some implementations, a search term of the search query may be a partial match identified between an unrecognized configuration item and a normalized computing resource type.

Search results from this variety of external information sources may be combined in a list of search results and returned to a calling module (e.g., returned by the search module 340 and passed to the ranker module 344).

Although the technique 520 is shown as a series of operations for clarity, implementations of the technique 520 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, the scraping 536 of a software API may be omitted.

Figure 5C:
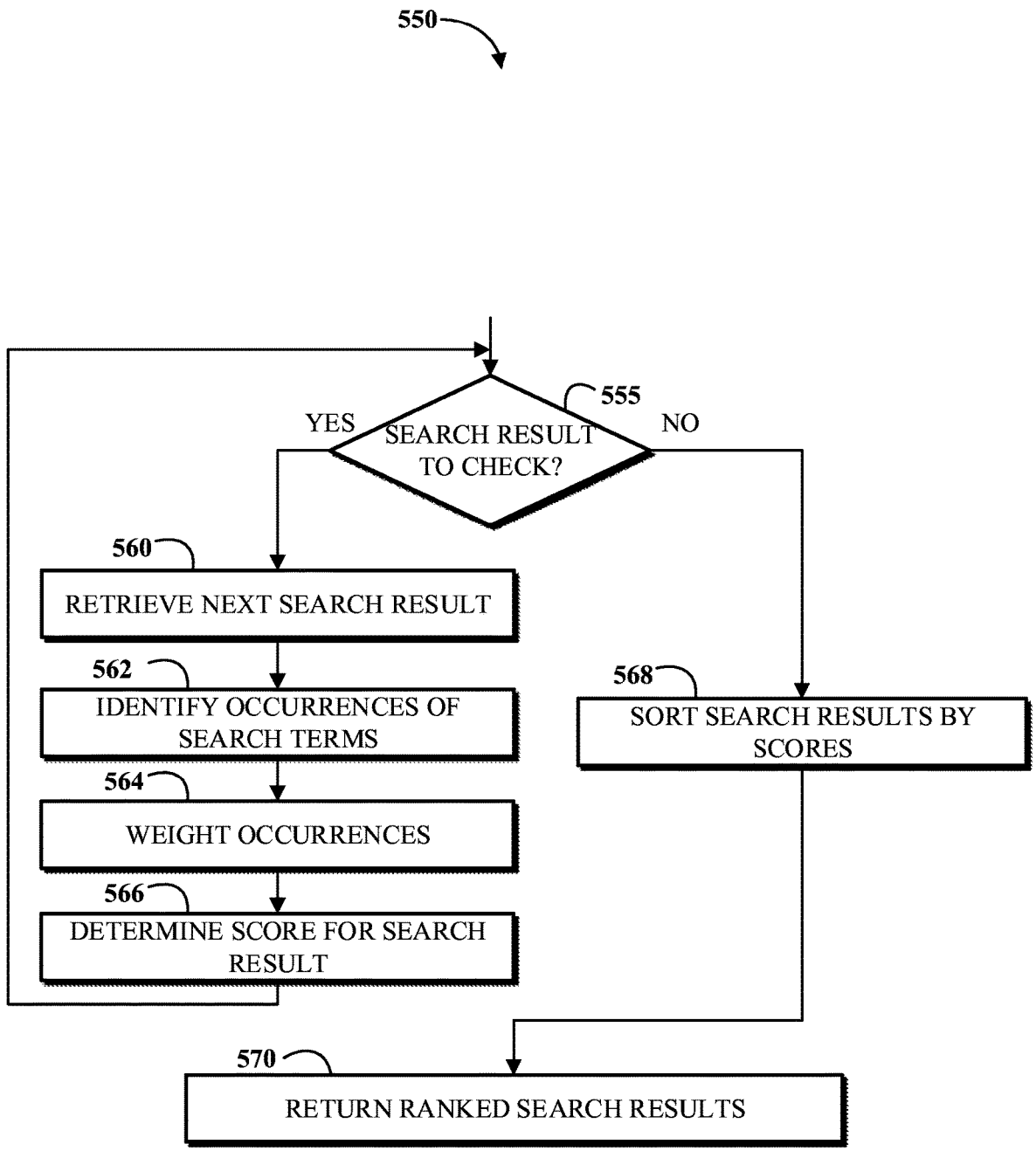
FIG. 5C is a logic flowchart illustrating an example of a technique for ranking search results.

FIG. 5C is a flowchart illustrating an example of a technique 550 for ranking search results in an electronic computing and communications system, such as the system 100 as generally illustrated in FIG. 1. In some implementations, the technique 550 can be executed using computing devices, such as the systems, modules, and devices described with respect to FIGS. 1, 2, and 3. In some implementations, the technique 550 can be performed, for example, by executing a machine-readable program or other computer-executable instructions, such as instructions or programs described according to JavaScript, C, or other such instructions. The steps, or operations, of the technique 550 or any other technique, method, process, or algorithm described in connection with the implementations disclosed herein can be implemented directly in hardware, firmware, software executed by hardware, circuitry, or a combination thereof.

The example technique 550 ranks a list of search results based on a search query. If (at operation 555) there is another search result in the list to check, then the next search result is retrieved 560. Occurrences of one or more search terms from the search query are identified 562. For example, the search terms may include partial matches between strings for a normalized computing resource type and strings for configuration item representing an unrecognized computing resource.

Occurrences of search terms within a search result are weighted 564 based on factors that may include the length (in characters) of search term match, a ratio of matched characters of the search query to unmatched characters of the search query (e.g., a percentage of the characters of the search query included in the search term) (exact matches of the search query are preferred), a count of repeated occurrences of a search term (though after a certain count the weight of this criteria should saturate and flatten out), proximity of search term occurrences (e.g., for search queries with multiple search terms, search results with the search terms occurring close together may be weighted more heavily than search results in which the search terms occur far apart), and/or the position of search term occurrences within a search result (e.g., occurrences in anchor text or a title may be ranked higher). A score for the search result may be determined 566 as a weighted sum of the occurrences of search terms within the search result.

If (at operation 555) there are no more search results remaining that need to be scored, then the search results are sorted 568 by the scores to obtain the ranked search results. The ranked search results may be returned 570 to a calling module (e.g., returned by the ranker module 344 and passed to the computing resource type selector module 346).

Although the technique 550 is shown as a series of operations for clarity, implementations of the technique 550 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Figure 5D:
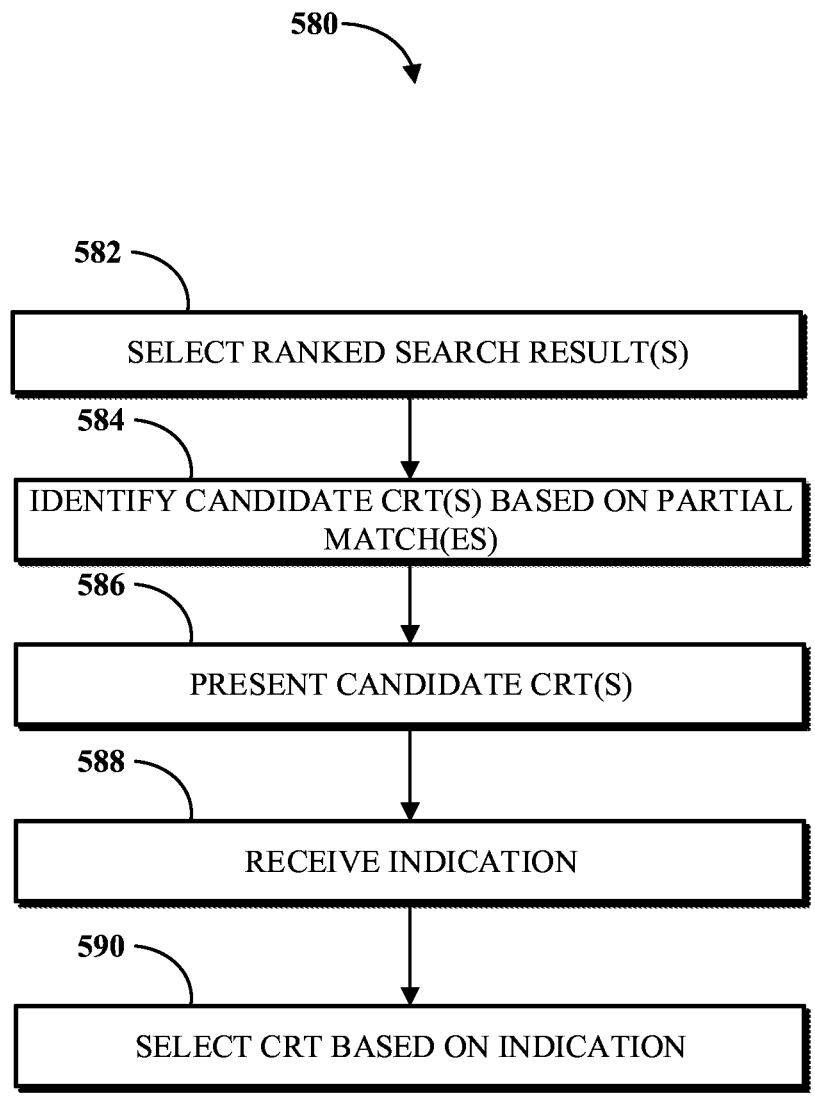
FIG. 5D is a logic flowchart illustrating an example of a technique for facilitating user identification of an unrecognized computing resource.

FIG. 5D is a flowchart illustrating an example of a technique 580 for facilitating user identification of an unrecognized computing resource in an electronic computing and communications system, such as the system 100 as generally illustrated in FIG. 1. In some implementations, the technique 580 can be executed using computing devices, such as the systems, modules, and devices described with respect to FIGS. 1, 2, and 3. In some implementations, the technique 580 can be performed, for example, by executing a machine-readable program or other computer-executable instructions, such as instructions or programs described according to JavaScript, C, or other such instructions. The steps, or operations, of the technique 580 or any other technique, method, process, or algorithm described in connection with the implementations disclosed herein can be implemented directly in hardware, firmware, software executed by hardware, circuitry, or a combination thereof.

The example technique 580 includes selecting 582 one or more of the search results based on the ranking of the search results. For example, the N (e.g., N=1, 3, 5, or 10) highest ranked search results may be selected 582. One or more candidate computing resource types are identified 584 based on partial matches between the selected one or more of the search results and values (e.g., strings) associated with the one or more candidate computing resource types.

The example technique 580 includes presenting 586 the one or more candidate computing resource types to a user. For example, the information about the candidate computing resource types and the unrecognized configuration item may be presented 586 to the user in a display (e.g., a display of the user interface 220). For example, the information about the candidate computing resource types and the unrecognized configuration item may be presented 586 to the user by transmitting (e.g., via a network communication unit 218) data to enable a display of this information to the user at a computing device (e.g., the target device 1312) operated by the user.

The example technique 580 includes receiving 588 an indication from the user that one of the one or more candidate computing resource types matches the configuration item. For example, the indication may be received 588 from the user via a user interface (e.g., a user interface 220). For example, the indication may be received 588 from the user via a network interface (e.g., a network communication unit 218). The indicated computing resource type is then selected 590 for normalization of the configuration item based on the indication from the user.

Although the technique 580 is shown as a series of operations for clarity, implementations of the technique 580 or any other technique, process, or algorithm described in connection with the implementations disclosed herein can be performed in various orders or concurrently. Additionally, operations in accordance with this disclosure can be performed with other operations not presented and described herein. For example, indications of correspondence between a configuration item and a normalized computing resource type may be used as feedback to build a knowledge base that can be used to reduce the number of unrecognized configuration items in the future. When the user provides an indication of correspondence, that information may be saved along with the unrecognized configuration item data. The next time the same configuration item data is encountered, the knowledge base may be used to automatically select the same computing resource type indicated by the user for the previous instance of that data. In this manner, the knowledge base of patterns associated with the normalized computing resources type may be expanded over time. In some implementations, the knowledge base may implement fuzzy logic algorithms to map configuration items to normalized computing resource types. In some implementations, the knowledge base may implement a set of self-learning rules to continually improve the detection and matching algorithms. Furthermore, one or more aspects of the systems and techniques described herein can be omitted.

Malware (e.g., computer viruses, Trojan horses, worms, etc.) often do not write to known registries, and they are designed to evade detection. The example techniques for identification of unrecognized software can be extremely helpful in such scenarios. In some implementations, running executables may be detected and identified using known virus signatures by automatically running web search comparisons and/or screen scraping off useful security websites.

In some implementations, fuzzy logic algorithms may be employed to use hardware metrics from a computing network to detect and help identify malware. For example, bands of normalcy for infrastructure metrics such as CPU, memory, or web server hits may be learned by monitoring these metrics over time. For example, it is normal for CPU and memory to spike at 8a.m. when people log in, but spikes in the middle of the night can indicate malicious activity. When an abnormality in a hardware metric is detected, the metric may be correlated with any other metrics that are also abnormal to look for possible cause-effect signatures between them. To keep correlation bounded, a short time window (e.g., about 2 hours) may be used to detect correlations (causal events tend to precede effects by a short time duration in most cases within a computing network). Correlation analysis may also be limited to groupings based on a common network subnet or common geographic location. In some implementations, users may provide manual hints to further tweak and improve the correlation algorithms.

Figure 6:
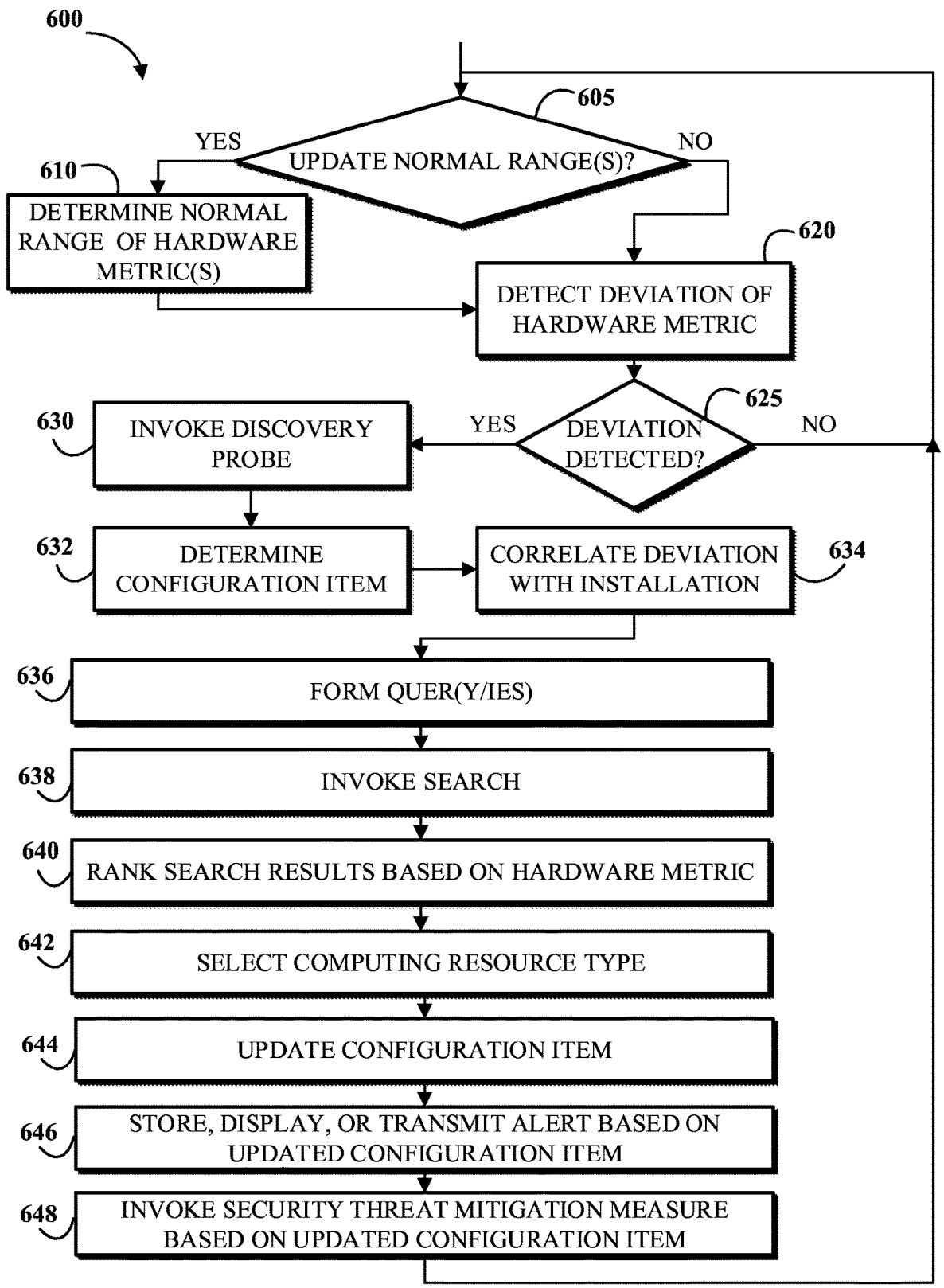
FIG. 6 is a logic flowchart illustrating an example of a technique for detecting and identifying a computer network security threat and responsively mitigating the threat.

FIG. 6 is a flowchart illustrating an example of a technique 600 for detecting and identifying a computer network security threat and responsively mitigating the threat in an electronic computing and communications system, such as the system 100 as generally illustrated in FIG. 1. In some implementations, the technique 600 can be executed using computing devices, such as the systems, modules, and devices described with respect to FIGS. 1, 2, and 3. In some implementations, the technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

The example technique 600 includes, when (at operation 605) it is time to update the normal range(s) for hardware metrics in a network being monitored and operationally configured (e.g., customer environment 302), determining 610 a normal range of one or more hardware metrics that are monitored in the network. The normal range for a hardware metric (e.g., processor utilization, memory utilization, network bandwidth utilization) may be periodic. For example, processor utilization may be low at night and high during workdays. Periodic patterns may be exhibited on different time scales, such as daily, weekly, monthly, quarterly, and/or yearly (e.g., patterns associated with holidays or deadlines). Discovery techniques may be employed to monitor various hardware metrics over comparable time periods and store the data as time series data. The normal range for a hardware metric may be determined 610 based on statistical analysis of the stored times series data for the hardware metric. The normal range for a hardware metric may be determined 610 based on time series data, including the most recent available time series data, from time to time (e.g., when (at operation 605) a timer triggers a regularly scheduled process to update the normal ranges for hardware metrics or a request/command to update the normal ranges for hardware messages is received from an administrator user for the network).

When the normal range(s) for the hardware metric(s) have been updated or when (at operation 605) it is not time to update the normal range(s), one or more hardware metrics may be checked (e.g., by invoking one or more discovery probes to gather hardware metrics) to detect 620 a deviation from a normal range for a hardware metric for a device in the network. For example, if network bandwidth usage by the device is much higher than normal for a particular time (e.g., late at night on a weekend) when this hardware metric is checked, that may indicate a problem of some kind and possibly a network security threat.

If (at operation 625) a deviation of a hardware metric for a device (e.g., target device N 314) from its normal range is detected 620, then, responsive to detecting the deviation, a discovery probe is invoked 630 against the device to obtain probe data. For example, the probe data may include information about devices installed and/or running on the device. One or more configuration items (e.g., representing hardware components and/or software components in the network) are determined 632, based at least in part on the probe data. For example, the configuration item(s) may include updates to existing configuration items in a network model (e.g., stored in the CMDB 332), and/or the configuration item(s) may include new configuration items that represent computing resources (e.g., software) that were not previously discovered installed and/or running on the device.

The example technique 600 includes correlating 634 the deviation with an installation of a software on the device. For example, the updated configuration item(s) may indicate that software associated with one of the configuration item(s) was installed at a time or in a time interval between discovery probes that is shortly before the time of the deviation in the hardware metric. The proximity in time of the appearance/installation of the software with the deviation in the hardware metric may be indicative of a causal relationship, thus the software, particularly if it is unrecognized, may be considered as a possible network security threat.

The example technique 600 includes forming 636 one or more search queries in a manner similar to that discussed in relation to operation 422 of FIG. 4. A search of external information sources is invoked 638 using the search quer(y/ies) to obtain search results, where the one or more information sources include one or more information sources listing network security threats. For example, network security product vendors (e.g., Cisco or Symantec) may offer current network security threat information on their websites, and government agencies may also offer network security threat information on their websites (e.g., the Federal Bureau of Investigation or the Department of Homeland Security at us-cert.gov). For example, data stored by the network security information provider may be scraped to obtain search results associated with malware. The search of the information sources may be invoked 638 in a manner similar to that described in relation to operation 430 of FIG. 4. For example, search providers (e.g., Google, Yahoo, or Bing) may also be utilized as part of the invoked 638 search.

The example technique 600 includes ranking 640 the search results based on the hardware metric. For example, search results from network security related information sources may have their scores for ranking increased or more heavily weighted based on the occurrence or the magnitude of the deviation from the normal range for the hardware metric. For example, the larger the deviation, the more likely it may be that the new software is a type of malware, and weighting of the scores may be used to bias the computing resource identification process toward a finding of malware. In some implementations, the search results from network security websites may include descriptions of effects of malware, including impacts on hardware metrics. For example, the search results may be ranked 640 based on scores determined in part based on occurrences of the deviated hardware metric in the search results. For example, search terms of the search query may include names and/or values of the deviated hardware metric, and thus these search terms may be used for gathering search results by invoking 638 the search and taken into account when ranking 640 the search results. In some implementations, search terms based on the names and/or values of the deviated hardware metric are used only for ranking 640 and not for gathering search results by invoking 638 the search.

The example technique 600 includes selecting 642 a computing resource type based on the ranked search results. The set of known computing resources may include known computer malware. In some implementations, this subset of known malware is updated and expanded by pulling data about new threats from network security related information sources (e.g., websites or databases) as part of investigating the deviation of the hardware metric. In this example, the selected 642 computing resource type is a computer malware. The configuration item for the software on the device may then be updated 644 to indicate that the software is computer malware.

The example technique 600 includes storing, displaying, or transmitting 646 a security alert message based on the updated configuration item. For example, the alert message may include information (e.g., information from network security related information sources) about the identified computer malware and the device on which it has been detected. The alert message may include suggested mitigation measures. For example, the alert message may be displayed (e.g., in a display of the user interface 220) to an administrator user for the network or transmitted, via a network interface (e.g., the network communication unit 218), to a computing device operated by an administrator user for display to that user. For example, the alert message may be stored in a database (e.g., the CMDB 332).

The example technique 600 includes invoking 648 a security threat mitigation measure based on the updated configuration item. For example, invoking 648 the mitigation measure may include causing a process of the computer malware running on the device to be terminated. For example, invoking 648 the mitigation measure may include causing the computer malware on the device to be uninstalled or otherwise removed. For example, invoking 648 the mitigation measure may include updating a firewall rule for the network.

Monitoring of the hardware metric(s) may continue after the network security threat has been identified and mitigated.

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

All or a portion of aspects of the systems and methods described herein can be implemented using a multi-purpose computer/processor with a computer program that, when executed, carries out any of the respective techniques, algorithms, and/or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations described or claimed herein. An example FPGA can include a collection of logic blocks and random access memory (RAM) blocks that can be individually configured and/or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The embodiments disclosed herein can be described in terms of functional block components and various processing operations. Such functional block components can be realized by any number of hardware and/or software components that perform the specified functions. For example, the described embodiments can employ various integrated circuit components (e.g., memory elements, processing elements, logic elements, look-up tables, and the like), which can carry out a variety of functions under the control of one or more microprocessors or other control devices. Similarly, where the elements of the described embodiments are implemented using software programming or software elements, the systems and methods can be implemented with any programming or scripting language, such as C, C++, Java, assembler, or the like, with the various algorithms being implemented with any combination of data structures, objects, processes, routines, or other programming elements. Functional aspects can be implemented in algorithms that execute on one or more processors. Furthermore, the embodiments of the systems and methods could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained within the apparatus.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or "one implementation" throughout this application is not intended to mean the same embodiment or implementation unless described as such.

The particular implementations shown and described herein are illustrative examples of the systems and methods and are not intended to otherwise limit the scope of the systems and methods in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships and/or physical or logical couplings between the various elements. Many alternative or additional functional relationships, physical connections, or logical connections can be present in a practical device.

The use of the terms "including," "comprising," "having," and variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a," "an," "the," and similar referents in the context of describing the systems and methods (especially in the context of the following claims) should be construed to cover both the singular and the plural. Furthermore, unless otherwise indicated herein, the recitation of ranges of values herein is intended merely to serve as a shorthand alternative to referring individually to separate values falling within the range, and the separate values are individually incorporated into the specification as if they were individually recited herein. Finally, the operations of all methods described herein are performable in any suitable order unless otherwise indicated herein or clearly indicated otherwise by the context. The use of any and all examples, or language suggesting that an example is being made (e.g., "such as"), provided herein is intended merely to better illuminate the systems and methods and does not pose a limitation on the scope of the systems and methods unless otherwise claimed.

All references, including publications, patent applications, and patents, cited herein are hereby incorporated by reference to the same extent as if each individual reference were individually and specifically indicated as being incorporated by reference and were set forth in its entirety herein.

The above-described embodiments have been described in order to facilitate easy understanding of the present systems and methods, and such descriptions do not limit the present systems and methods. To the contrary, the systems and methods are intended to cover various modifications and equivalent arrangements included within the scope of the appended claims, which scope is to be accorded the broadest interpretation as is permitted under the law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for normalizing configuration items to facilitate network operations, the system comprising:
   a network interface;
   a memory; and
   a processor, wherein the memory includes instructions executable by the processor to cause the system to:
      access a configuration item stored in a configuration management database (CMDB) associated with a computing resource;
      identify one or more partial matches between one or more values associated with the configuration item and one or more corresponding values associated with one or more computing resource types, wherein the one or more values comprise alpha-numeric characters associated with the configuration item, and wherein the one or more corresponding values comprise alpha-numeric characters describing the one or more computing resource types;
      form a string of alpha-numeric characters extracted from the one or more values based on the one or more partial matches;
      send the string of alpha-numeric characters to one or more external information sources as a search query, and wherein the one or more external information sources comprise a network security information provider;
      receive, from one or more external information sources, a list of search results from the one or more external information sources based on the search query, and wherein receiving the list of search results comprises:
         scraping data stored by the network security information provider to obtain results associated with malware, and wherein the list of search results comprises the results associated with the malware;
      display ranked results for the list of search results, wherein the search results are ranked based on a number of occurrences of the string in the search results;
      identify one or more ranked candidate computing resource types based on a partial match between a respective record for the one or more ranked candidate computing resource types and a result from the ranked results; and
      receive selection of a candidate computing resource type from the one or more ranked candidate computing resource types to update the configuration item to store, in the CMDB, an association between the configuration item and the candidate computing resource type.

2. The system of claim 1, wherein the memory includes instructions executable by the processor to cause the system to:
- detect a deviation from a normal range for a hardware metric for a device; and
- correlate the deviation with an installation of a software on the device, wherein the configuration item is associated with the software, the one or more external information sources include one or more information sources listing network security threats, and the candidate computing resource type is a computer malware.

3. The system of claim 1, wherein the one or more external information sources comprise a cloud-based search provider and wherein the memory includes instructions executable by the processor to cause the system to:
- transmit the string to the cloud-based search provider as part of a search request.

4. The system of claim 1, wherein ranking based on the number of occurrences comprises ranking based on a length of the string, a ratio of matched alpha-numeric characters of the string to each search result of the plurality of search results, a count of repeated occurrences of a term in the string, a proximity of search term occurrences, or a position of a particular search term in the string relative within the plurality of search results, or any combination thereof.

5. A system operable to normalize configuration items stored in a configuration management database (CMDB), wherein the configuration items are associated with computing resources to facilitate network operations, and wherein the system comprises:
- a memory; and
- a processor, wherein the memory includes instructions executable by the processor to cause the system to:
  - identify one or more partial matches between a value associated with a configuration item and a corresponding value associated with one or more computing resource types from a set of computing resource types, wherein the value comprises one or more alpha-numeric characters associated with the configuration item, and wherein the corresponding value comprises one or more alpha-numeric characters describing the one or more computing resource types;
  - form a search query comprising alpha-numeric characters extracted from the value based on the one or more partial matches;
  - invoke a search of one or more external information sources using the search query to obtain a plurality of search results, wherein the one or more external information sources comprise a network security information provider, and wherein invoking the search comprises:
    - scraping data stored by the network security information provider to obtain results associated with malware, wherein the plurality of search results comprises the results associated with the malware;
  - display a ranked list of search results comprising the plurality of search results, wherein the search results are ranked based on a number of occurrences of the search query in the plurality of search results;
  - receive selection of one computing resource type from the ranked list of search results; and
  - update the configuration item to associate the configuration item with the selected computing resource type.

6. The system of claim 5, wherein the memory includes instructions executable by the processor to cause the system to:
- detect a deviation from a normal range for a hardware metric for a device; and
- correlate the deviation with an installation of a software on the device, wherein the configuration item is associated with the software, the one or more external information sources comprise one or more information sources listing network security threats, and the selected computing resource type is a computer malware.

7. The system of claim 6, wherein the memory includes instructions executable by the processor to cause the system to:
- responsive to detecting the deviation, invoke a discovery probe against the device to obtain probe data; and
- determine, based at least in part on the probe data, the configuration item.

8. The system of claim 6, wherein the plurality of search results are ranked based on the hardware metric.

9. The system of claim 6, wherein the memory includes instructions executable by the processor to cause the system to:
- invoke a security threat mitigation measure based on the updated configuration item.

10. The system of claim 6, wherein the memory includes instructions executable by the processor to cause the system to:
- store, display, or transmit a security alert message based on the updated configuration item.

11. The system of claim 5, wherein the instructions to select the one computing resource type of the set computing resource types include instructions executable by the processor to cause the system to:
- select one search result of the plurality of search results based on the ranking of the search results;
- identify a partial match between the selected one search result of the plurality of search results and a value associated with the one computing resource type of the computing resource types; and
- select the one computing resource type of the computing resource types based on the partial match between the selected one search result of the plurality of search results and the value associated with the one computing resource type of the computing resource types.

12. A method for associating computing resource types with a computing resource, the method comprising:
- accessing a configuration item stored in a configuration management database (CMDB) associated with the computing resource;
- identifying one or more partial matches between one or more values associated with the configuration item and one or more corresponding values associated with one or more computing resource types, wherein the one or more values comprise alpha-numeric characters associated with the configuration item, and wherein the one or more corresponding values comprise alpha-numeric characters describing the one or more computing resource types;
- forming a search query comprising alpha-numeric characters extracted from the one or more values based on the one or more partial matches;
- invoking a search of one or more external information sources using the search query to obtain a plurality of search results, wherein the one or more external information sources comprise a network security information provider, and wherein invoking the search comprises:

scraping data stored by the network security information provider to obtain results associated with malware, wherein the plurality of search results comprises the results associated with the malware;

displaying a ranked list comprising the plurality of search results, wherein the ranked list is ranked based on a number of occurrences of the search query in the plurality of search results;

receiving selection of a candidate computing resource type from the ranked list;

updating the configuration item to associate the configuration item with the candidate computing resource type; and storing the updated configuration item.

13. The method of claim 12, comprising:
detecting a deviation from a normal range for a hardware metric for a device; and
correlating the deviation with an installation of a software on the device, wherein the configuration item is associated with the software, the one or more external information sources comprise one or more information sources listing network security threats, and the candidate computing resource type is a computer malware.

14. The method of claim 13, comprising:
responsive to detecting the deviation, invoking a discovery probe against the device to obtain probe data; and
determining, based at least in part on the probe data, the configuration item.

15. The method of claim 13, comprising:
invoking a security threat mitigation measure based on the updated configuration item.

16. The method of claim 13, comprising:
storing, displaying, or transmitting a security alert message based on the updated configuration item.

17. The method of claim 12, comprising identifying the candidate computing resource type, comprising:
ranking the plurality of search results based on occurrences of search terms from the search query;
selecting one search result of the plurality of search results based on the ranking of the plurality of search results; and
identifying a partial match between the selected one search result of the plurality of search results and a value associated with the candidate computing resource type.

18. The method of claim 12, comprising identifying the candidate computing resource type, comprising:
ranking the plurality of search results based on occurrences of search terms from the search query;
selecting one search result of the plurality of search results based on the ranking of the plurality of search results;
identifying a plurality of candidate computing resource types based on partial matches between the selected one search result of the plurality of search results and values associated with the candidate computing resource types;
presenting the plurality of candidate computing resource types to a user;
receiving an indication from the user that one candidate computing resource type of the plurality of candidate computing resource types matches the configuration item; and
selecting the candidate computing resource type based on the indication from the user.

\* \* \* \* \*